United States Patent [19]
Eagar

[11] Patent Number: 6,051,963
[45] Date of Patent: Apr. 18, 2000

[54] METHODS AND APPARATUS FOR ACTIVELY SNUBBING WAVEFORMS IN SWITCHING REGULATORS

[75] Inventor: Dale R. Eagar, Black Forest, Colo.

[73] Assignee: Linear Technology Corporation, Milpitas, Calif.

[21] Appl. No.: 09/169,524

[22] Filed: Oct. 9, 1998

[51] Int. Cl.[7] .......................... H02H 7/10; H02H 7/122; G05F 1/40; G05F 1/44

[52] U.S. Cl. ........................ 323/282; 323/285; 363/50; 363/56

[58] Field of Search ................. 363/50, 55, 56; 323/222, 282, 284, 285

[56] References Cited

U.S. PATENT DOCUMENTS

| | | | |
|---|---|---|---|
| 4,504,896 | 3/1985 | Easter et al. | 363/21 |
| 4,849,873 | 7/1989 | Vanderhelst | 363/55 |
| 4,870,554 | 9/1989 | Smith | 363/56 |
| 4,894,567 | 1/1990 | Lenk | 307/542 |
| 4,972,292 | 11/1990 | Petersen | 363/56 |
| 5,130,917 | 7/1992 | Shekhawat | 363/56 |
| 5,351,179 | 9/1994 | Tsai et al. | 363/53 |
| 5,381,327 | 1/1995 | Yan | 363/24 |
| 5,414,613 | 5/1995 | Chen | 363/52 |
| 5,416,361 | 5/1995 | John et al. | 327/310 |
| 5,461,302 | 10/1995 | Garcia et al. | 323/222 |
| 5,477,131 | 12/1995 | Gegner | 323/222 |
| 5,736,842 | 4/1998 | Jovanovic | 323/222 |
| 5,828,559 | 10/1998 | Chen | 363/56 |

*Primary Examiner*—Edward H. Tso
*Assistant Examiner*—Bao Q. Vu
*Attorney, Agent, or Firm*—Fish & Neave; Michael E. Shanahan

[57] ABSTRACT

A switching regulator that actively snubs waveforms is provided. The switching regulator includes an inductor, a power switch electrically coupled to the inductor, a first diode electrically coupled to the inductor, and a snubber circuit being coupled in parallel to the inductor. The power switch and the snubber circuit include break-before-make switches such that the power switch is closed only after the snubber switch is opened to initiate a switching cycle, and the snubber switch is closed only after the power switch is opened to provide a decay path for snubbing ringing waveforms.

18 Claims, 5 Drawing Sheets

METHODS AND APPARATUS FOR ACTIVELY SNUBBING WAVEFORMS IN SWITCHING REGULATORS

BACKGROUND OF THE INVENTION

This invention relates to switching regulators. More particularly, this invention relates to switching regulators that actively snub waveforms so that power loss is minimized and system efficiency is maintained.

Ringing waveforms and transient pulses, for example, are generally present in switching regulators, at least because of the switching action of high-power switches employed by the regulators. These ringing waveforms must be damped or they can lead to, for example, device failure, excessive electromagnetic interference (EMI) or instability.

It is generally known in the art to employ snubbers in power circuits to alter waveforms such as by damping ringing that is present in the power circuits. One well-known and often used snubber is an RC damping circuit. The RC snubber suffers because it dissipates power on all voltage excursions applied to it; thus, much power is wasted. Another known snubber is a diode RC circuit. Although the diode RC snubber provides an improvement over the RC snubber (because the diode provides better control in one direction), the diode RC snubber still suffers from severe inefficiency by dissipating power unnecessarily.

Other snubber designs are also known in the art. For example, U.S. Pat. No. 4,894,567 discloses a snubber circuit that includes a semiconductor switching element, a capacitor and a shunting inductance. And U.S. Pat. No. 5,414,613 discloses a snubber circuit that includes a semiconductor switching element, a pair of diodes, an inductor and a capacitor.

These snubber designs also pose inefficiency problems. This is especially the case when the designs are applied to circuits involving only a few watts of power. Furthermore, they employ additional circuit components that introduce significantly increased cost and circuit complexity.

What is desired, therefore, is to provide a method and apparatus for actively altering waveforms in switching regulators so that any loss of power or efficiency is minimized and so that cost and circuit complexity can be minimized.

SUMMARY OF THE INVENTION

It is an object of the invention to provide a switching regulator that actively snubs waveforms to minimize power loss.

Another object of the invention is to provide a switching regulator that actively snubs waveforms while maintaining system efficiency.

Still another object of the invention is to provide a switching regulator having the above characteristics while minimizing cost and circuit complexity.

These and other objects of the invention are achieved by a switching regulator having an inductor, a power switch electrically coupled to the inductor, a first diode electrically coupled to the inductor, and a snubber circuit coupled in parallel to the inductor. The power switch and the snubber circuit include break-before-make switches such that the power switch is closed after the snubber circuit is opened to initiate a switching cycle and the snubber circuit is closed after the power switch is opened to provide a decay path for snubbing ringing waveforms.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE INVENTION

Figure 1:
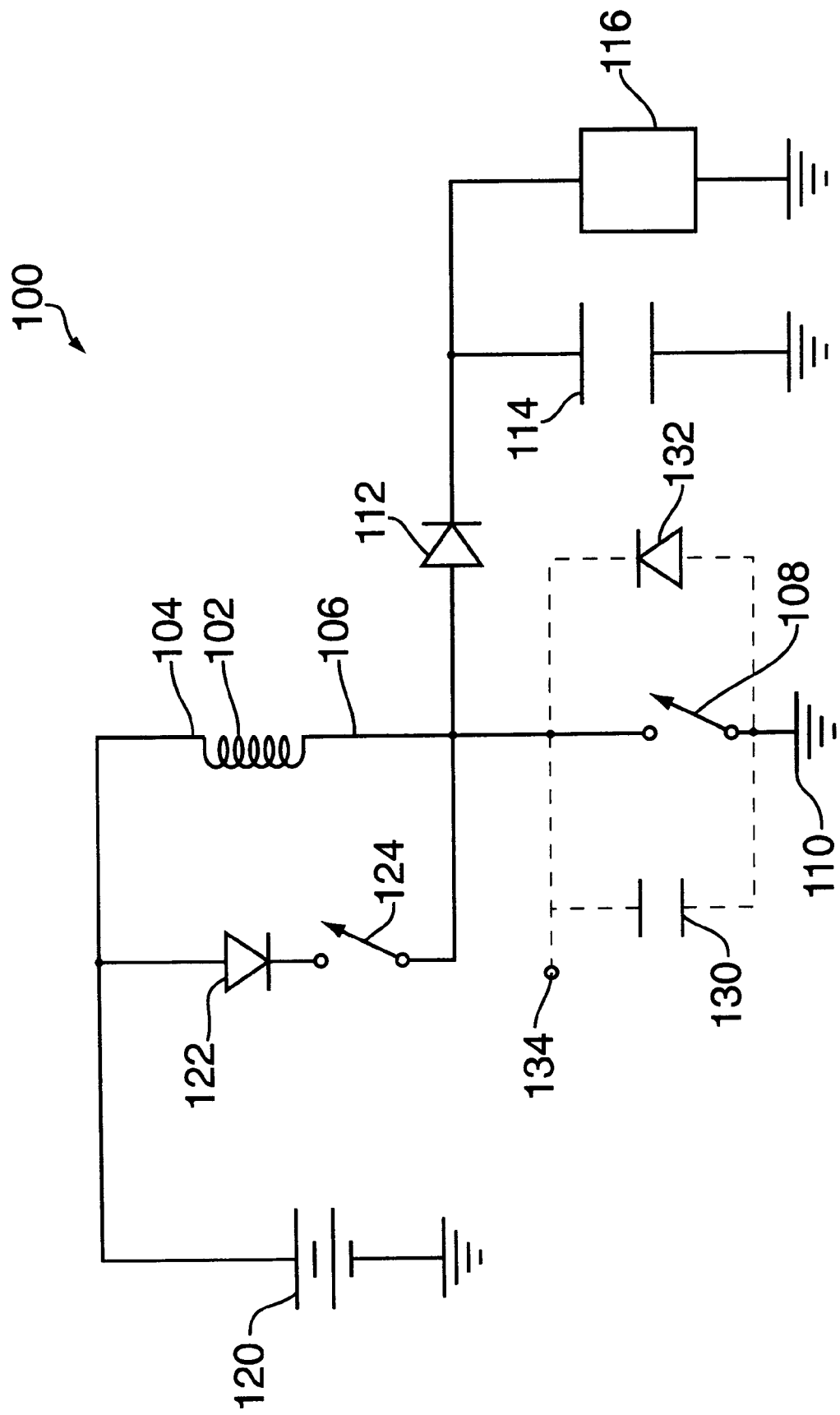
FIG. 1 is a schematic diagram of a step-up type switching regulator having an active snubber circuit in accordance with the principles of the present invention.

FIG. 1 is a schematic diagram of an embodiment of a switching regulator 100 having an active snubber circuit in accordance with the present invention. Although the switching regulator 100 shown in FIG. 1 is a step-up type, it will become apparent to a person skilled in the art reviewing the following detailed description that the present invention can also be utilized with other switching regulator topologies.

The switching regulator 100 includes an inductor 102 having a first terminal 104 and a second terminal 106, a power switch 108 coupled between the inductor 102 and a first node at low potential, which is illustratively shown in FIG. 1 as ground 110, and a first diode 112 coupled to the second terminal 106 of the inductor 102. For high-frequency, fast-switching applications, the first diode 112 is preferably a Schottky diode. Input voltage is provided to the switching regulator 100 by a DC power supply 120 coupled to the first terminal 104 of the inductor 102.

The switching regulator 100 further includes an output capacitor 114 coupled to the first diode 112. Output voltage is delivered through load 116. Coupled in parallel to the inductor 102 is a snubber circuit, which includes a second diode 122 and a snubber switch 124. To represent stray capacitance and parasitic body diode associated with the power switch 108, a stray capacitor 130 and a parasitic diode 132 are shown in dotted lines coupled in parallel to the power switch 108.

Figure 2:
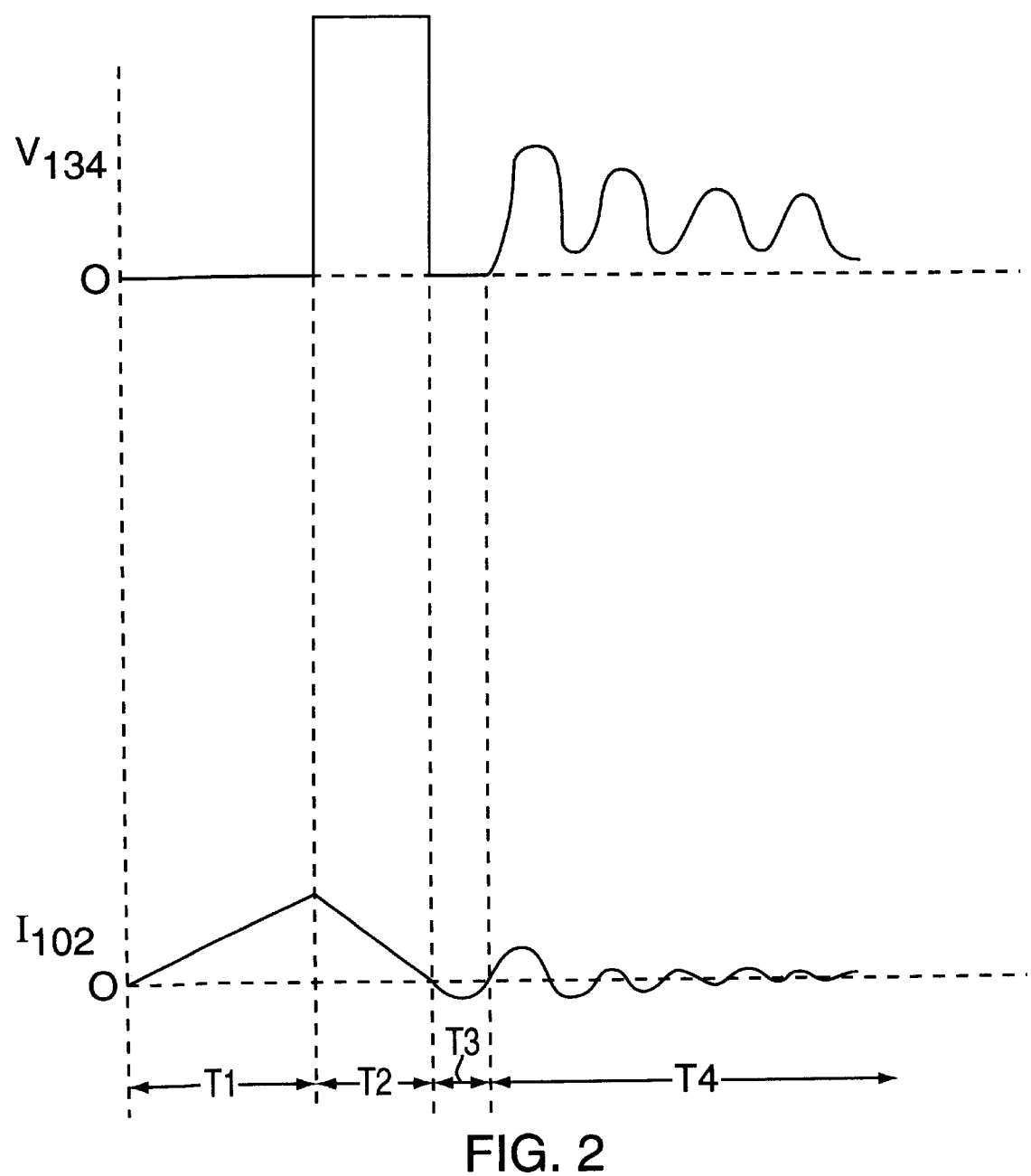
FIG. 2 shows voltage and current waveforms for the switching regulator of FIG. 1 when the snubber circuit is disabled.
Figure 3:
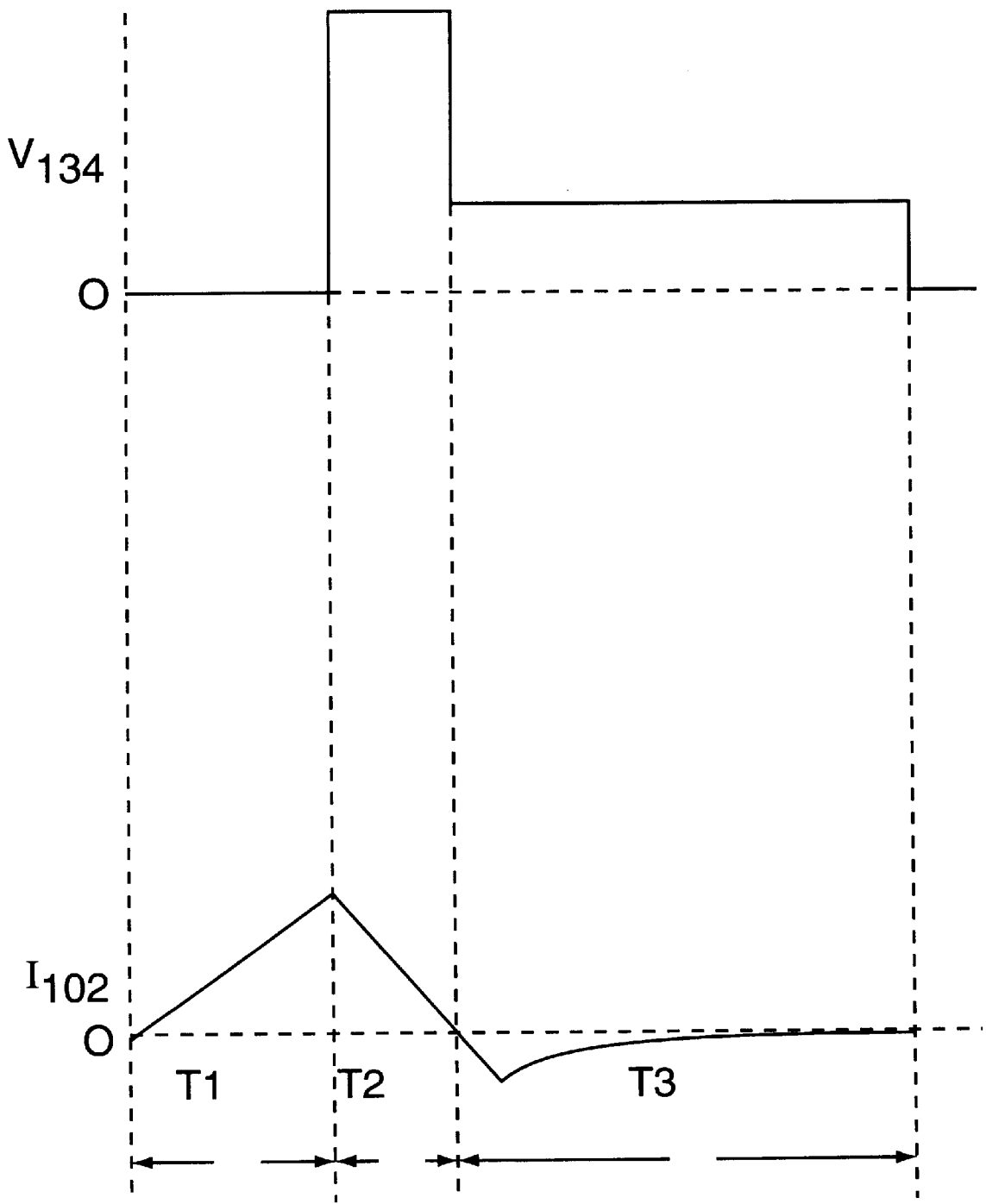
FIG. 3 shows voltage and current waveforms for the switching regulator of FIG. 1 when the snubber circuit is in operation.

Operation of the switching regulator 100 of FIG. 1 will be described in conjunction with waveform diagrams of FIGS. 2 and 3. For ease of reference, the node between the inductor 102 and the power switch 108 is referred to as second node 134. FIG. 2 shows waveforms for voltage on the second node 134 and for current in the inductor 102 when the switching regulator 100 of FIG. 1 is unsnubbed; that is, when the snubber circuit is disabled by keeping the snubber switch 124 open throughout the switching cycle of the power switch 108. By contrast, FIG. 3 shows waveforms for voltage on the second node 134 and for current in the inductor 102 when the snubber circuit is in operation. The advantages provided by the active snubbing design of the present invention will be apparent from the following descriptions of FIGS. 2 and 3.

Referring to FIG. 2, to initiate time period T1, the power switch 108 is closed and the current in the inductor 102 rises as a ramp. The voltage on the second node 134 is zero during T1. When the power switch 108 opens, signaling the beginning of time period T2, the current in the inductor 102 starts to flow, swinging the voltage on the second node 134 from zero to a preselected value, which for purposes of illustration will be 48 Volts (the DC power supply 120 is assumed to provide 12 V for this example). This voltage on the second node 134 forward biases the first diode 112 (conducting state), causing the output capacitor 114 to be charged up. During time period T2, the current in the inductor 102 decays until it reaches zero at the end of T2, causing the first diode 112 to go into its blocking state. At the end of time period T2, the voltage on the second node 134 is back to zero.

Once the first diode 112 has returned to its blocking state, a parallel resonant tank is formed by the inductor 102 and the stray capacitor 130 ("LC tank"). This corresponds to the beginning of time period T3. At this moment, the stray capacitor 130 has been charged to 48 V from time period T2 and the LC tank is at its positive voltage peak with the equivalent voltage across the stray capacitor 130 being 36 V (48 V minus 12 V from the DC power supply 120). Since the LC tank acts as an oscillator, the voltage on the second node 134 is a 72 V peak-to-peak sine wave offset 12 V by the DC power supply 120.

As the sine wave drops past 12 V on its way to −24 V, the LC tank ringing is interrupted by the parasitic diode 132 of the power switch 108. During time period T3, the current flows through the parasitic diode 132 and the inductor 102 and flows into the DC power supply 120 until the current in the inductor 102 reaches zero again. When the parasitic diode 132 is no longer forward-biased (thus, in its blocking state), the LC tank is at its negative voltage peak.

During time period T4, the LC tank rings down at its natural resonant frequency and quality factor. The voltage on the second node 134 and the current in the inductor 102 for T4 is shown in FIG. 2. The ringing down of the LC tank continues until the beginning of the next switching cycle, when the power switch 108 is once again closed.

As demonstrated by FIG. 2, there are several disadvantages for the unsnubbed switching regulator. First, for a monolithic switching regulator, where the power switch is located on the same integrated circuit as the logic, the forward-biased state of the parasitic diode 132 during time period T3 introduces unwanted current which tends to "confuse" the logic. Second, the voltage on the second node 134 and the current in the inductor 102 behaves in an oscillatory manner, resulting in excessive EMI. And third, the current value in the inductor 102 is dependent on when the next switching cycle begins. Thus, the inductor current can lengthen or shorten the next ON cycle depending on its value. This often causes instability in the current mode system.

Referring now to FIG. 3, there is shown waveforms for the voltage on the second node 134 and for the current in the inductor 102 when the snubber circuit of the switching regulator 100 of FIG. 1 is in operation. It should be noted that the power switch 108 and the snubber switch 124 are preferably break-before-make switches such that when one of the switches is opened, there is a preselected delay (such as 200 nanoseconds) before the other switch is closed.

During time period T1, the power switch 108 is closed, the snubber switch 124 is open and the current in the inductor 102 rises as a ramp. The voltage on the second node 134 is zero during T1. When the power switch 108 opens, signaling the beginning of time period T2, the current in the inductor 102 starts to flow, swinging the voltage on the second node 134 from zero to the preselected value, which for purposes of illustration will be 48 Volts (consistent with the example of FIG. 2). This voltage on the second node 134 forward biases the first diode 112 (conducting state), causing the output capacitor 114 to be charged up. After the preselected delay (such as the 200 nanoseconds given as an example above), the snubber switch 124 is closed and the second diode 122 goes into its blocking state. Time period T2 continues until the current in the inductor 102 reaches zero, causing the first diode 112 to go into its blocking state.

With the first diode 112 in the blocking state, an LC tank is formed by the inductor 102 and the stray capacitor 130. At this moment, the stray capacitor 130 has been charged to the preselected value (48 V in this example) from time period T2. The stray capacitor 130 discharges into the inductor 102, starting the ringing of the LC tank at its natural resonant frequency. This corresponds to the beginning of time period T3. The stray capacitor 130 discharges until the voltage across it is equal to the DC power supply 120 (following the exemplary values given for FIG. 2, the stray capacitor 130 discharges to 12 V).

When the voltage of the stray capacitor-inductor falls a diode forward drop (e.g., 0.7 V for silicon) below the 12 V of the DC power supply 120, the second diode 122 goes into its conducting state. With the second diode 122 in conducting state, the current in the inductor 102 flows through the second diode 122 and gradually decays to zero. The snubber switch 124 is opened and after the preselected delay, the power switch 108 is closed, initiating the next switching cycle.

As demonstrated by FIG. 3, providing an active snubber circuit to the switching regulator provides substantial advantages over the unsnubbed regulator represented in FIG. 2. The actively snubbed regulator of the present invention minimizes power loss and maintains system efficiency by reducing or eliminating: excessive EMI by substantially eliminating ringing during off-time; current mode instability attributed to ringing; and reverse current in the parasitic diode 132.

Figure 4:
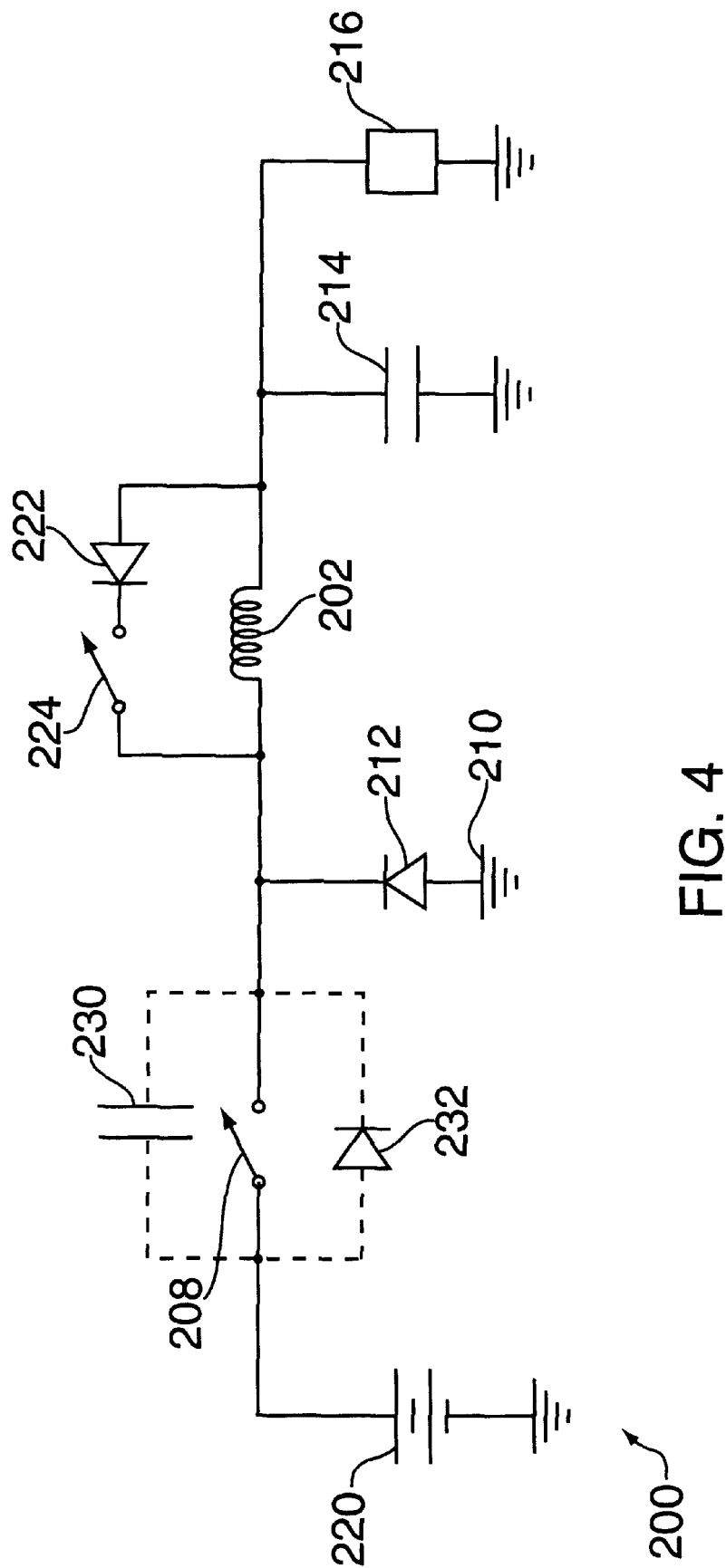
FIG. 4 is a schematic diagram of a step-down type switching regulator having an active snubber circuit in accordance with the principles of the present invention.

FIG. 4 is a schematic diagram of a step-down type switching regulator 200 having an active snubber circuit in accordance with the present invention. The switching regulator 200 includes a transistor serving as a power switch 208, a first diode 212 coupled to the power switch 208 and a node at low potential, which is illustratively shown as ground 210, and an inductor 202 electrically coupled to the power switch 208 and the first diode 212. As with the first diode 112 of the step-up type switching regulator 100 of FIG. 1, the first diode 212 in FIG. 4 is preferably a Schottky diode for high-frequency, fast-switching applications. Input voltage is provided by a DC power supply 220 coupled to the power switch 208.

Coupled to the inductor 202 is an output capacitor 214. Output voltage is delivered through load 216. Coupled in parallel to the inductor is a snubber circuit, which includes a second diode 222 and a snubber switch 224. To represent stray capacitance and parasitic body diode associated with the power switch 208, a stray capacitor 230 and a parasitic diode 232 are shown in dotted lines coupled in parallel to the power switch 208. It should be noted that the power switch 208 and the snubber switch 224 are preferably break-before-make switches such that when one of the switches is opened, there is a preselected delay before the other switch is closed.

In view of the description accompanying the step-up type switching regulator 100 shown in FIGS. 1–3, it will be apparent to a person skilled in the art that the snubber circuit in FIG. 4, like the snubber circuit in FIG. 1, will provide a decay path for snubbing ringing waveforms while the power switch 208 is open and the snubber switch 224 is closed. The actively snubbed regulator of FIG. 4 will thus minimize power loss and maintain system efficiency and stability.

Figure 5:
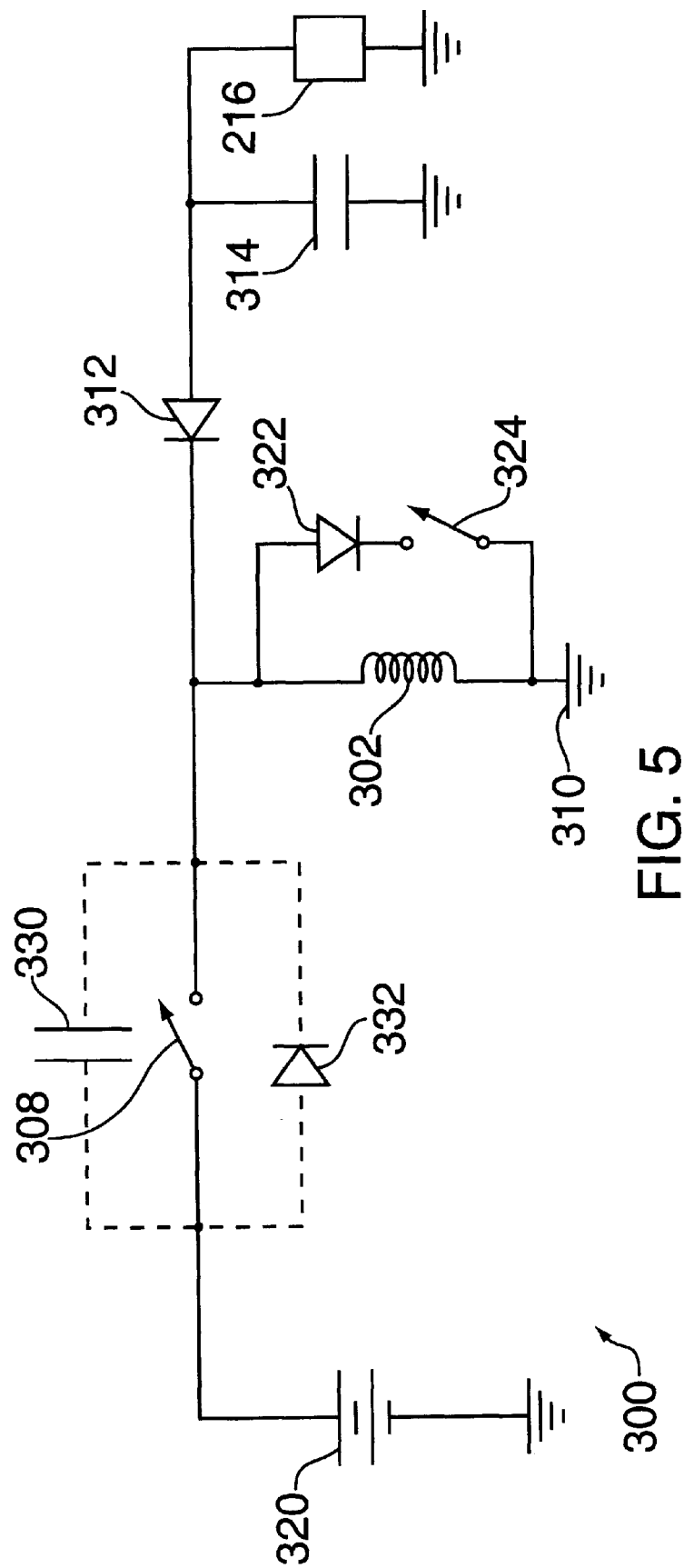
FIG. 5 is a schematic diagram of a voltage-inverter type switching regulator having an active snubber circuit in accordance with the principles of the present invention.

FIG. 5 is a schematic diagram of a voltage-inverter type switching regulator 300 having an active snubber circuit in accordance with the present invention. The switching regulator 300 includes a power switch 308, a first diode 312 electrically coupled to the power switch 308 and an inductor 302 electrically coupled to the power switch 308 and a node at low potential, which is illustratively shown as ground 310. As with the first diode 312 of the step-up type switching regulator 300 of FIG. 1 and the first diode 312 of the step-down type switching regulator 300 of FIG. 4, the first diode 312 in FIG. 5 is preferably a Schottky diode for high-frequency, fast-switching applications. Input voltage is provided by a DC power supply 320 coupled to the power switch 308.

Coupled to the first diode 312 is an output capacitor 314. Output voltage is delivered through load 316. Coupled in parallel to the inductor is a snubber circuit, which includes a second diode 322 and a snubber switch 324. To represent stray capacitance and parasitic body diode associated with the power switch 308, a stray capacitor 330 and a parasitic diode 332 are shown in dotted lines coupled in parallel to the power switch 308. It should be noted that the power switch 308 and the snubber switch 324 are preferably break-before-make switches such that when one of the switches is opened, there is a preselected delay before the other switch is closed.

Like the snubber circuits in FIGS. 1 and 4, the snubber circuit in FIG. 5 will provide a decay path to snub ringing waveforms while the power switch 308 is open and the snubber switch 324 is closed. The actively snubbed regulator of FIG. 5 will thus minimize power loss and maintain system efficiency.

Persons skilled in the art will thus appreciate that the present invention can be practiced by other than the described embodiments, which are presented for purposes of illustration and not of limitation, and the present invention is limited only by the claims which follow.

What is claimed is:

1. A method for snubbing waveforms in a switching regulator while maintaining regulator efficiency, said switching regulator including an inductor, a power switch and a rectifying diode electrically coupled to said inductor, a snubber circuit comprising a snubber switch, said snubber circuit being coupled in parallel to said inductor, the method comprising:

beginning a switching cycle by switching said power switch CLOSED while said snubber switch is OPEN;

switching said power switch OPEN while said snubber switch is OPEN;

switching said snubber switch CLOSED while said power switch is OPEN;

decaying current flowing through said inductor via said snubber circuit when said rectifying diode self-commutates so that current in said inductor is prevented from repeatedly changing polarity; and switching said snubber switch OPEN to end said switching cycle.

2. The method of claim 1, which further comprises preserving energy stored in stray capacitance associated with said power switch so that said preserved energy is provided to said switching regulator at next switching cycle.

3. The method of claim 1, wherein said decaying is characterized by the use of a snubber diode coupled in series with said snubber switch.

4. A switching regulator coupled to an input power supply and having an output node, said switching regulator comprising:

an inductor;

a power switch electrically coupled to said inductor;

a rectifying diode electrically coupled to said inductor;

an output capacitor coupled to said output node; and a snubber circuit coupled in parallel to said inductor, said snubber circuit comprising a snubber switch that is CLOSED only after said power switch is OPENED to provide a decay path for snubbing ringing waveforms when said rectifying diode self-commutates such that current in said inductor is prevented from repeatedly changing polarity, and such that said power switch is CLOSED only after said snubber switch is OPENED.

5. The switching regulator of claim 4, wherein said rectifying diode is a Schottky diode.

6. The switching regulator of claim 4, wherein said rectifying diode is electrically coupled to said output node.

7. The switching regulator of claim 4, wherein said snubber circuit further comprises a snubber diode coupled in series with said snubber switch.

8. The switching regulator of claim 4, wherein said regulator is a step-up type.

9. The switching regulator of claim 4, wherein said regulator is a step-down type.

10. The switching regulator of claim 4, wherein said regulator is a voltage-inverter type.

11. A switching regulator coupled to an input power supply and having an output node, said switching regulator comprising:

a transistor having stray capacitance and parasitic diode characteristics associated therewith;

an inductor electrically coupled to said transistor;

a rectifying diode electrically coupled to said inductor;

an output capacitor electrically coupled to said output node; and a snubber circuit coupled in parallel to said inductor, said snubber circuit comprising a snubber diode in series with a snubber switch, said snubber switch being CLOSED a first preselected delay after said transistor is OPENED to provide a decay path for snubbing ringing waveforms associated with said transistor, said decay path being provided when said rectifying diode self-commutates such that current in said inductor is prevented from repeatedly changing polarity, and said transistor being CLOSED a second preselected delay after said snubber switch is OPENED.

12. The switching regulator of claim 11, wherein said rectifying diode is a Schottky diode.

13. The switching regulator of claim 11, wherein said rectifying diode is electrically coupled to said output node.

14. The switching regulator of claim 11, wherein said inductor is electrically coupled to said output node.

15. The switching regulator of claim 11, wherein said regulator is a step-down type.

16. The switching regulator of claim 11, wherein said regulator is a voltage-inverter type.

17. The switching regulator of claim 11, wherein said first and second preselected delays are substantially the same.

18. A switching regulator coupled to an input power supply and having an output node, said switching regulator comprising:

a transistor having output capacitance and parasitic diode characteristics associated therewith;

an inductor electrically coupled to said transistor;

a rectifying element electrically coupled to said inductor;

an output capacitor electrically coupled to said output node; and a snubber circuit coupled in parallel to said inductor, said snubber circuit comprising a snubber diode in series with a snubber switch, said snubber switch being CLOSED after said transistor is OPENED and a voltage across said inductor approaches zero to provide a decay path for snubbing ringing waveforms associated with the regulator, said decay path being provided when said rectifying diode self-commutates such that current in said inductor is prevented from repeatedly changing polarity, said transistor being CLOSED a preselected delay after said snubber switch is OPENED.

* * * * *